(12) United States Patent
Takeuchi

(10) Patent No.: US 6,184,774 B1
(45) Date of Patent: Feb. 6, 2001

(54) SEMICONDUCTOR PRESSURE DETECTING DEVICE WITH PIEZO RESISTANCE CROSSING GRAIN BOUNDARIES

(75) Inventor: Takanobu Takeuchi, Itami (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 08/441,194

(22) Filed: May 15, 1995

(30) Foreign Application Priority Data

Aug. 4, 1994 (JP) .................................................... 6-183705

(51) Int. Cl.[7] .................................................... H01C 10/10
(52) U.S. Cl. .................................... 338/42; 338/2; 338/6
(58) Field of Search ........................ 338/2–6, 42; 257/419

(56) References Cited

U.S. PATENT DOCUMENTS

| | | | |
|---|---|---|---|
| 3,137,834 | * | 6/1964 | Pfann .......................................... 338/2 |
| 3,965,453 | * | 6/1976 | Seidel et al. ............................... 338/2 |
| 4,406,992 | * | 9/1983 | Kurtz et al. ................................ 338/2 |
| 4,439,752 | * | 3/1984 | Starr .......................................... 338/2 |
| 4,579,600 | * | 4/1986 | Shah et al. ............................. 148/1.5 |
| 4,651,120 | * | 3/1987 | Aagard ....................................... 338/4 |
| 5,047,827 | * | 9/1991 | Clark, Jr. et al. ...................... 257/537 |
| 5,471,086 | * | 11/1995 | Ipposhi et al. ......................... 257/417 |

FOREIGN PATENT DOCUMENTS

| | | | |
|---|---|---|---|
| 1405111 | * | 9/1975 | (GB) ......................................... 338/3 |
| 4-259744 | * | 4/1994 | (JP) .......................................... 338/3 |

OTHER PUBLICATIONS

Cook, The Theory of the Electromagnetic Field, p114 (1975).*

* cited by examiner

Primary Examiner—Karl D. Easthom
(74) Attorney, Agent, or Firm—Leydig, Voit & Mayer, Ltd.

(57) ABSTRACT

The object of the present invention is to obtain high-precision semiconductor pressure detecting devices without unevenness in gauge resistance values.

When a recrystal silicone film 23 is formed by use of laser, a crystal subgrain boundary 27 generates, and crystal fault is included in (100) direction. A metallic wiring 51 of aluminum or gold is arranged on said crystal subgrain boundary 27 crossing a gauge resistance 3A. The current running through a gauge resistance formed by said recrystal silicone film 23 runs into said metallic wiring 51 at the portion of said crystal subgrain boundary 27. Therefore, the current running through said gauge resistance is unlikely to be affected by crystal fault.

High-precision and high-sensitivity semiconductor pressure detecting devices are realized with reduced affection by crystal fault.

3 Claims, 6 Drawing Sheets

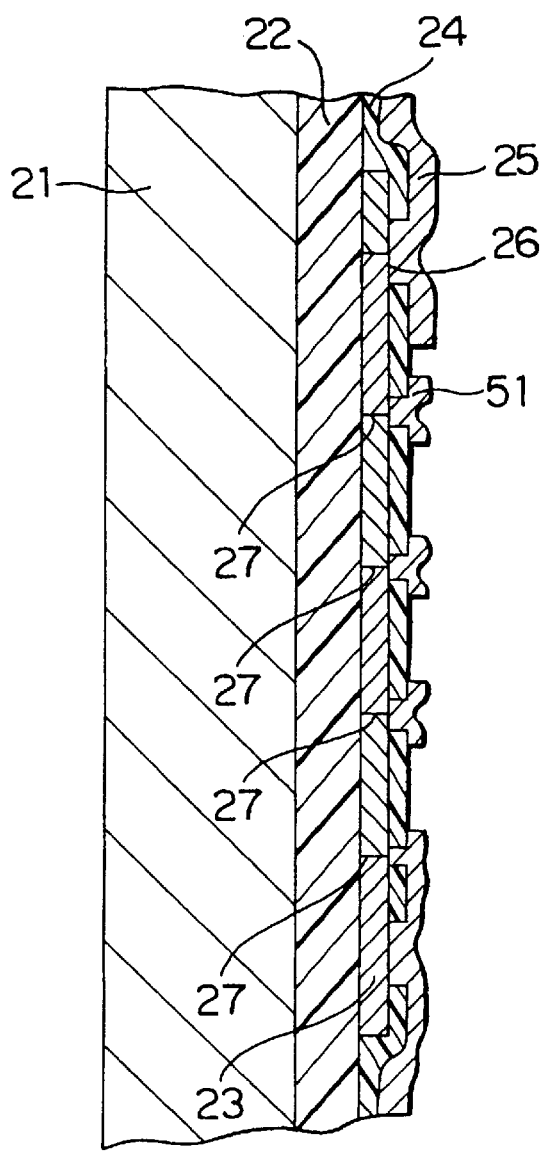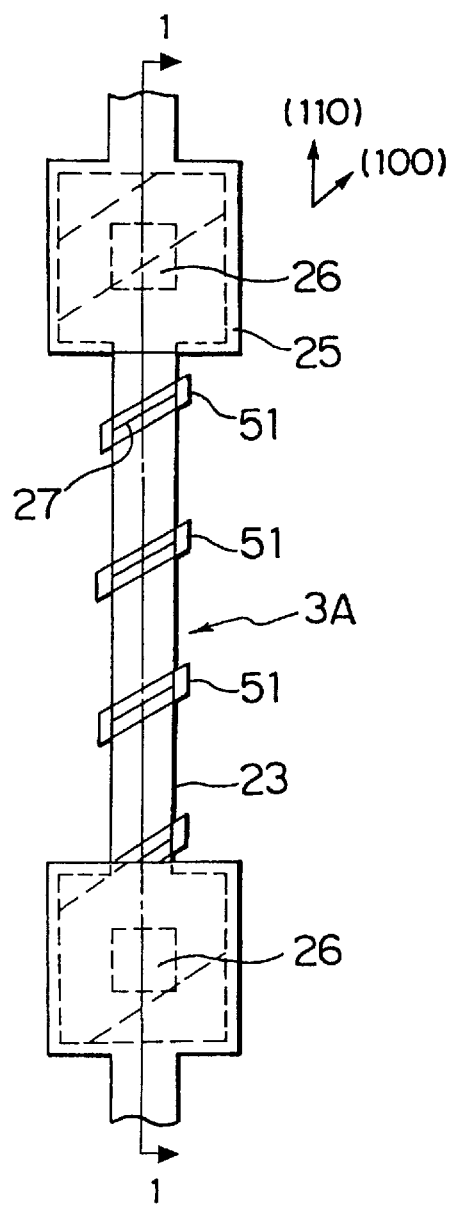

PRESSURE

SEMICONDUCTOR PRESSURE DETECTING DEVICE WITH PIEZO RESISTANCE CROSSING GRAIN BOUNDARIES

BACKGROUND OF THE INVENTION

1. Field of the Invention

The present invention relates to semiconductor pressure detecting devices. More specifically, the present invention relates to semiconductor pressure detecting devices using the piezoresistance effect.

2. Description of Prior Art

FIG. 8 shows a schematic lateral cross section of a conventional semiconductor pressure detecting device, including a silicon chip 1 for converting measured pressure into a voltage and mounted on a pedestal, for example, a silicon pedestal 5. The silicon pedestal 5 is arranged to relieve external stress imposed on the silicon chip 1. The silicon pedestal 5, on which the silicon chip has previously been die-bonded, is mounted on a stem 6 by die bonding. Arranged on this stem 6 is a pressure introduction pipe 7 for transmitting external pressure to the silicon chip 1. The silicon chip 1 is electrically connected with an external apparatus via wires 8 wire-bonded to the silicon chip 1, and leads 9 supported in the stem 6 with an insulating material 12. The silicon chip 1, wire 8, and other elements are covered with a metallic cap 11 having a relief opening 10.

In the conventional semiconductor pressure sensor, pressure introduced through the pressure introduction pipe 7 is applied to the silicon chip 1, converted into voltage by the silicon chip 1, and then output via the wire 8 and lead 9.

FIG. 9 is a plan view showing the silicon chip 1 of the semiconductor pressure detecting device illustrated in FIG. 8, while FIG. 10 is a side view of the silicon chip 1. In these figures, the silicon chip 1 has a (100) crystalline surface. On the reverse side of the silicon chip 1, a thin portion 2 is formed, and gauge resistances 3a to 3d are located on four corners of the surface of the silicon chip 1 corresponding to the thin portion 2.

The conventional semiconductor pressure detecting device and its gauge resistances are formed as illustrated in FIG. 7. Namely, by means of conventional laser recrystallization, a recrystallized silicon film 15 was produced in the (100) direction from seeds 13 and 14 by heating with a laser. However, a subgrain boundary 16, a crystalline fault, occurs at the boundary of the recrystallized silicon film 15. Conventionally, p-type gauge resistances 3 have been employed to avoid this subgrain boundary 16.

In the semiconductor pressure detecting device described above, even if a gauge resistance is arranged in order to avoid a subgrain boundary, some subgrain boundaries are produced, resulting in non-uniform resistances of the gauge resistors, and also greatly non-uniform offset voltages. Further, the temperature coefficient of resistance is non-linear. Because of these problems, it is very difficult to compensate for the temperature characteristics of the semiconductor pressure detecting device and a high-precision semiconductor pressure detecting device cannot be provided.

SUMMARY OF THE INVENTION

The present invention avoids the problems of the prior art, and the object of the present invention is to produce highly-precise semiconductor pressure detecting devices without non-linearities in gauge resistance values.

According to a first aspect of the present invention, there is provided a semiconductor pressure detecting device including a silicon chip having a narrow central portion of one face, and several gauge resistances, each gauge resistance comprising a piezoresistance element made by laser crystallization and located adjacent to an edge of the narrow portion. The crystal face of the silicon chip has a (100) or equivalent orientation, and the gauge resistances are p-type conductivity gauge resistances arranged along (110) directions. Metal wiring is located on and crosses the subgrain boundaries.

According to a second aspect of the present invention, there is provided a semiconductor pressure detecting device including a silicon chip having a narrow central portion, and several gauge resistances, each gauge resistance comprising a piezoresistance element made by laser crystallization and located adjacent to an edge of the narrow portion on the other face. The crystalline face of the silicon chip has a (100) or equivalent orientation, and the gauge resistances are p-type conductivity gauge resistances arranged along (110) directions, and a high dopant impurity concentration p-type diffusion region is located adjacent to each of the subgrain boundaries.

According to a third aspect of the present invention, there is provided a semiconductor pressure detecting device equipped with a silicon chip having a narrow central portion and several gauge resistances, each gauge resistance comprising a piezoresistance element made by laser crystallization and located adjacent to an edge of the narrow portion on the other face. The face of the silicon chip has a (100) or equivalent orientation, and the gauge resistances are n-type resistances arranged along (110) directions, parallel to the subgrain boundaries.

According to a fourth aspect of the present invention, there is provided a semiconductor pressure detecting device including a silicon chip having a thin portion near the central portion of one face, and several gauge resistances, each gauge resistance comprising a piezoresistance element made by laser crystallization and located adjacent to the narrow portion. The face of the silicon chip has a (100) or equivalent orientation, and the gauge resistances are located along edges of the narrow portion in the shape of stairs with a subgrain boundary at each edge.

Other objects and advantages of the present invention will become apparent from the detailed description to follow taken in conjunction with the appended claims.

BRIEF DESCRIPTION OF THE DRAWINGS

These and other objects and many of the attendant advantages of this invention will be readily appreciated as the same becomes better understood by reference to the following detailed description when considered in connection with the accompanying drawings.

FIG. 1 is a cross section showing the semiconductor pressure detecting device in accordance with a preferred embodiment of the present invention.

FIG. 2 is a plan view showing the semiconductor pressure detecting device in accordance with the first preferred embodiment of the present invention.

DESCRIPTION OF THE PREFERRED EMBODIMENTS

Embodiment 1

Figure 3:
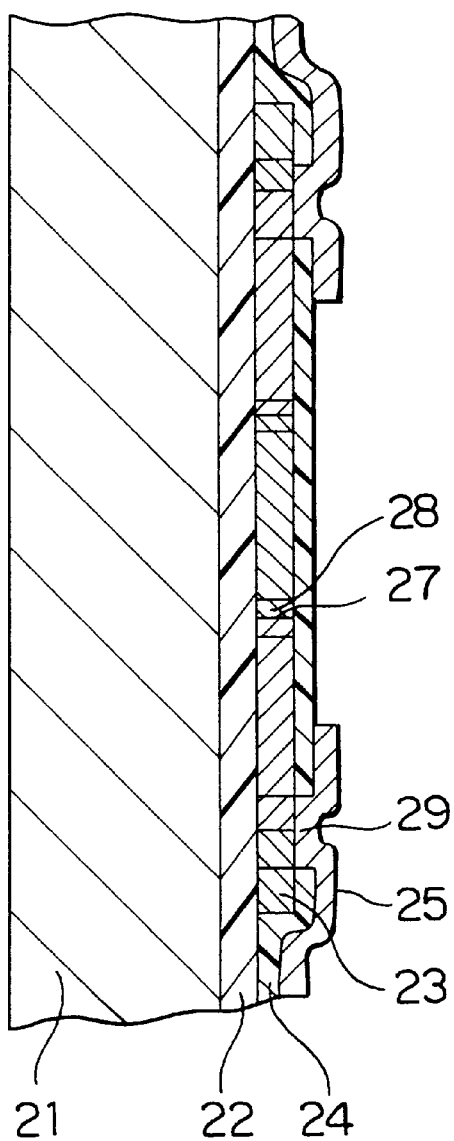
FIG. 3 is a cross section showing a semiconductor pressure detecting device in accordance with a second preferred embodiment of the present invention.

FIG. 1 is a cross-sectional view showing a semiconductor pressure detecting device in accordance with a first preferred embodiment of the present invention, while FIG. 2 is a plan view showing the semiconductor pressure detecting device. In the respective figures, identical numbers represent the same or equivalent parts, and FIG. 1 is a cross-sectional view taken along line 1—1 of FIG. 2. In these figures, an oxide film 22 is formed on the surface of a single crystal substrate 21, and polysilicon is deposited on the oxide film 22. A recrystallized silicon film 23 produced by laser recrystallization is formed. This recrystallized silicon film 23 has the same crystalline orientation as the single crystal substrate 21. The single crystal substrate has a (100) or equivalent crystalline orientation.

The recrystallized silicon film 23 is etched to produce the shape of gauge resistance 3A, and boron is implanted into the recrystallized silicon film 23. An insulating film 24 is deposited and patterned to provide access to the recrystallized silicon film 23 at respective locations. Next, contacts 26 are formed on the recrystallized silicon film 23, using the insulating film 24 as a mask. A metallic wiring 25 of aluminum or gold is formed and electrically connected to the gauge resistance 3A through the contact portions 26.

When the recrystallized silicon film 23 is formed by laser recrystallization, subgrain boundaries 27 are produced, including crystal faults on the (100) surface. A metallic wiring 51 of aluminum of gold is arranged on the surface of this subgrain boundary 27.

In the semiconductor pressure detecting device configured as mentioned above, the current flowing through the gauge resistance 3A of the recrystallized silicon film 23 flows into the metallic wiring 51 at the subgrain boundaries 27. Therefore, the current flowing through the gauge resistance is unlikely to be affected by the subgrain boundaries. Accordingly, the non-uniformity in gauge resistance values is removed, and a high-precision semiconductor pressure detecting device is obtained.

Embodiment 2

Figure 4:
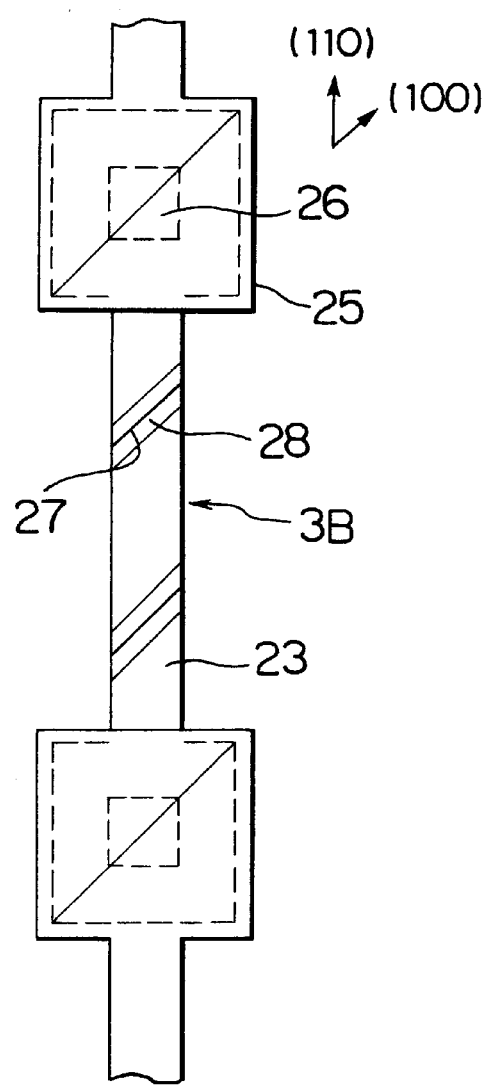
FIG. 4 is a plan view showing a semiconductor pressure detecting device in accordance with the second preferred embodiment of the present invention.

FIG. 3 is a cross section showing a semiconductor pressure detecting device in accordance with a second preferred embodiment of the present invention. FIG. 4 is a plan view showing the semiconductor pressure detecting device. In these figures, a p$^+$-type region 28 as a high dopant impurity concentration p-type region including a high-concentration boron is located on the recrystallized silicon film 23 adjacent to the subgrain boundary 27 of the gauge resistance 3B. The resistance value at this p$^+$-type region is low, so that it is unlikely to be affected by the subgrain boundaries. Accordingly, non-uniformity in gauge resistances is removed, and a high-precision semiconductor pressure detecting device is obtained.

Embodiment 3

Figure 5:
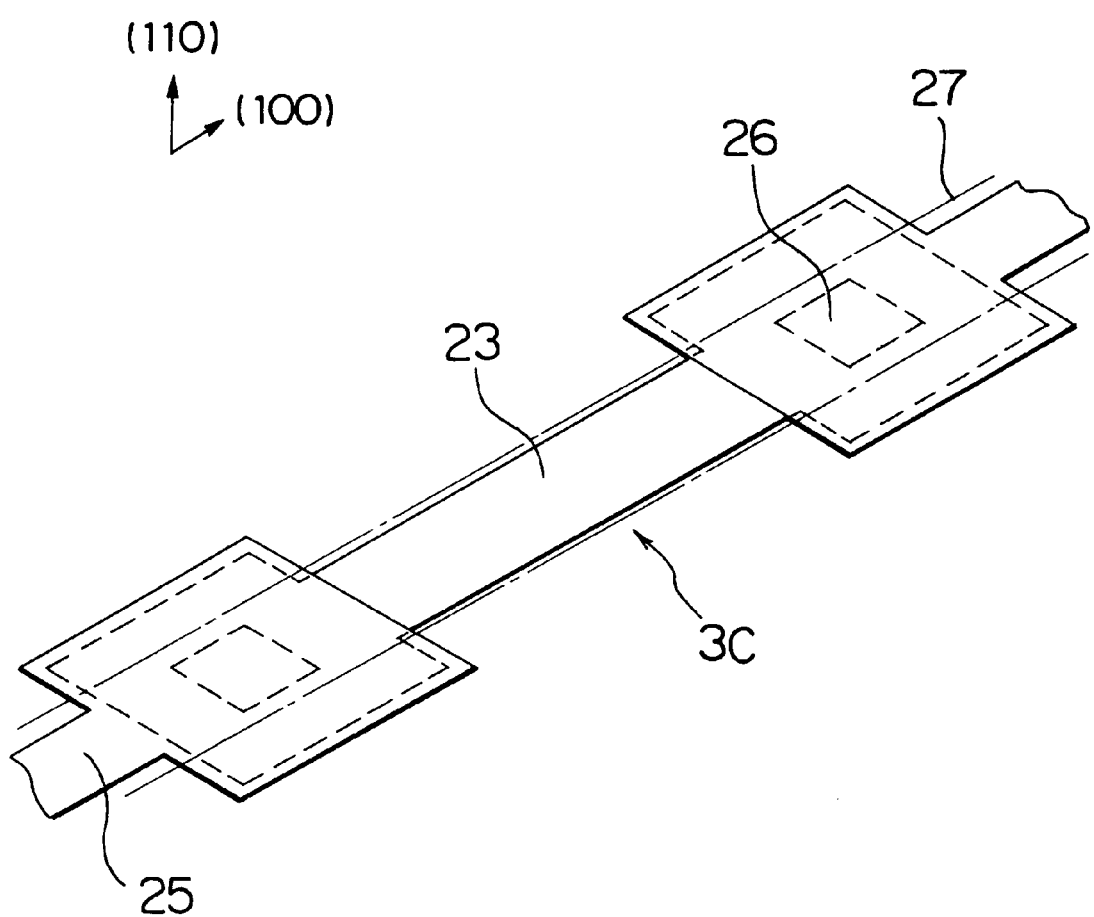
FIG. 5 is a schematic view showing a portion of a semiconductor pressure detecting device in accordance with a third preferred embodiment of the present invention.

FIG. 5 is a schematic view showing a portion of a semiconductor pressure detecting device in accordance with a third preferred embodiment of the present invention. In the first and second embodiments, since the piezoresistance effect is employed, the gauge resistances are arranged along (110) directions, but in this orientation, the subgrain boundary 27 is involved. Therefore, a gauge resistance 3C is arranged along the (100) direction. In order to arrange the gauge resistance 3C along the (100) direction and thereby to attain a piezoresistance effect, an n-type conductivity gauge resistance is formed.

Because the gauge resistance 3C is formed in the (100) direction, it is unlikely to be affected by the subgrain boundary 27, and, as a consequence, the non-uniformities in the resistances and their temperature coefficients are eliminated, and a high-precision semiconductor pressure detecting device is produced.

Embodiment 4

Figure 6:
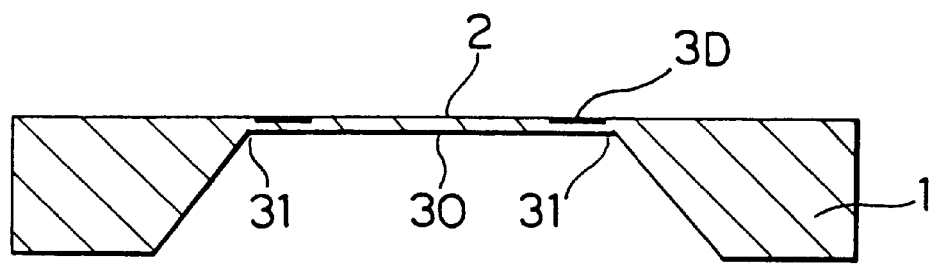
FIG. 6 is a lateral cross section showing a silicon chip of a semiconductor pressure detecting device in accordance with a fourth preferred embodiment of the present invention.

FIG. 6 is a cross section showing the silicon chip 1 of a semiconductor pressure detecting device in accordance with a fourth preferred embodiment of the present invention. In this figure, when pressure is applied to a diaphragm 30 in the silicon chip 1, the diaphragm 30 deflects, generating strain. It is well known to those skilled in the art that when using (100) oriented surfaces, the location of a gauge resistance 3D at an edge 31 of the diaphragm 30 produces a highly sensitive semiconductor pressure detecting device with the largest rate of change of resistance values per unit strain.

Figure 7:
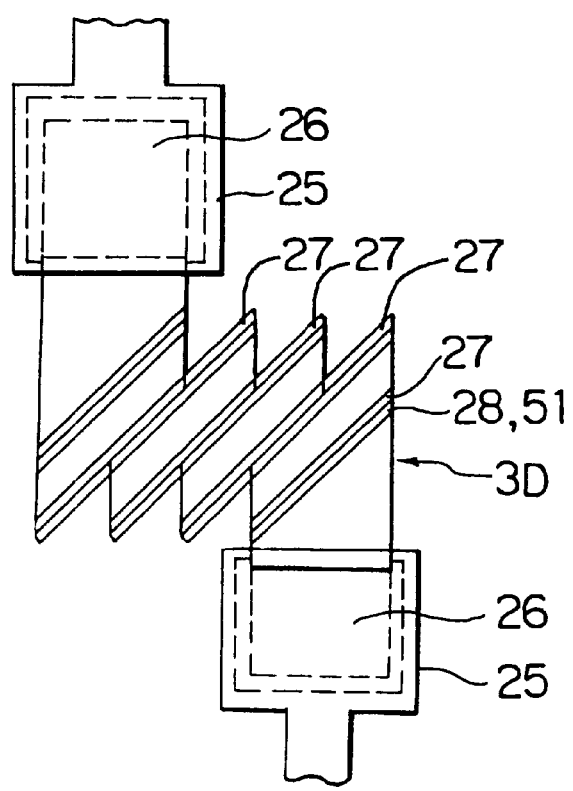
FIG. 7 is a plan view showing a silicon chip of the semiconductor pressure detecting device in accordance with the fourth preferred embodiment of the present invention.
Figure 8:
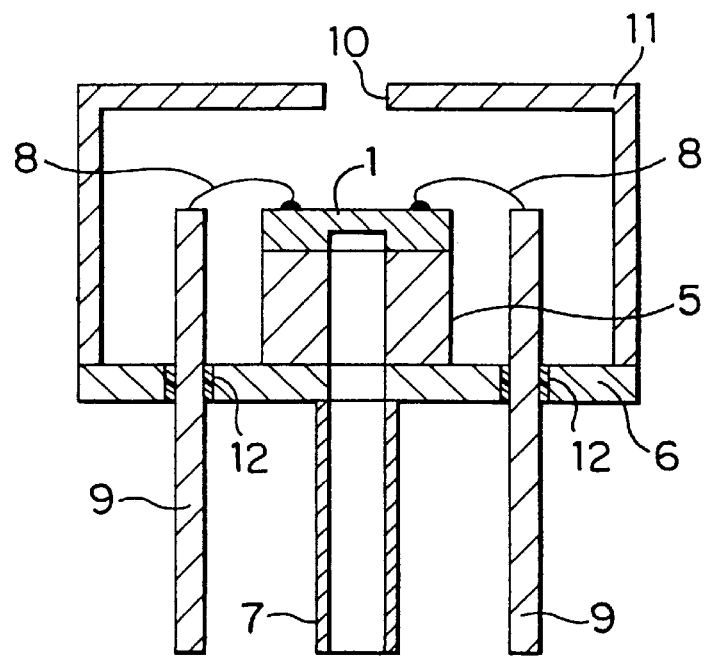
FIG. 8 is a schematic lateral cross section showing a conventional semiconductor pressure detecting device.
Figure 9:
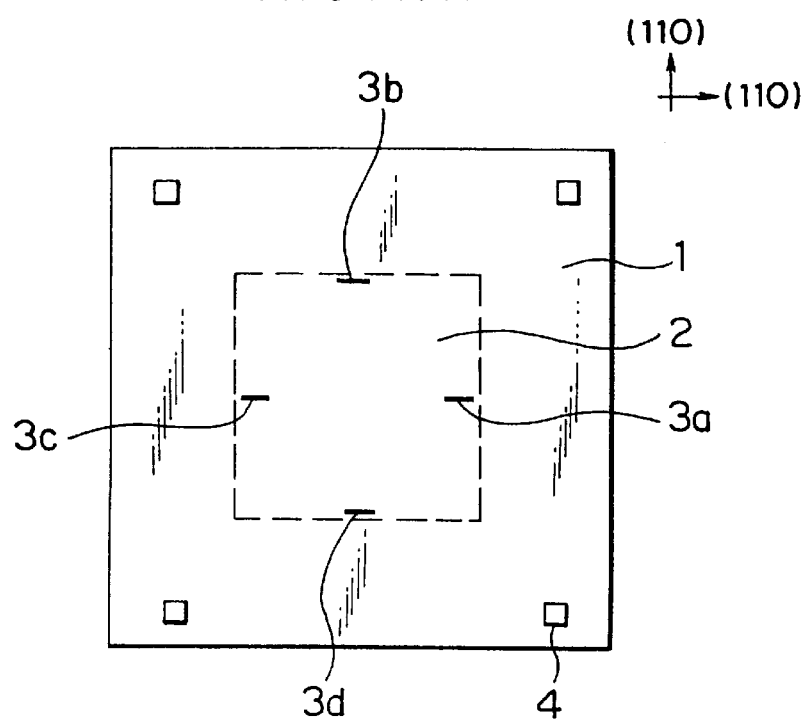
FIG. 9 is a plan view of the silicon chip of the semiconductor pressure detecting device shown in FIG. 8.
Figure 10:
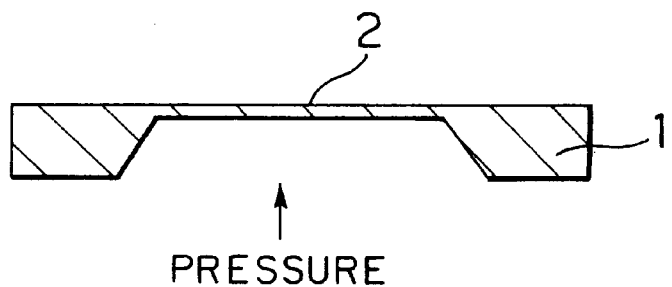
FIG. 10 is a plan view of the silicon chip shown in FIG. 9.
Figure 11:
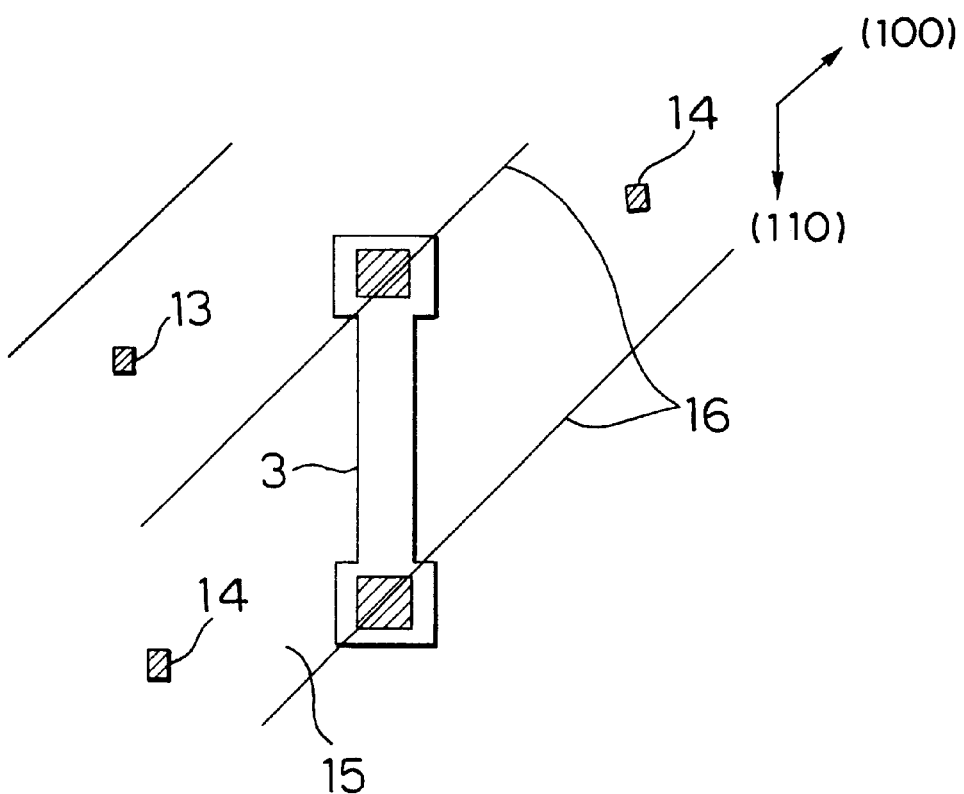
FIG. 11 is a plan view showing the gauge resistors of a conventional semiconductor pressure detecting device.

Therefore, as shown in FIG. 7, the gauge resistances 3D have the shape of stairs or saw teeth in order to place the gauge resistance 3D adjacent to the edge 31 of the diaphragm 30. This design produces a highly sensitive semiconductor pressure detecting device. Also, the metallic wiring 51 may be arranged on the surface of the crystal subgrain boundary 27, or the p$^+$-type region 28 may be located adjacent the subgrain boundary 27, whereby, a high-precision semiconductor pressure detecting device is produced.

As the present invention may be embodied in several forms without departing from the spirit or essential characteristics thereof, the present embodiments are illustrative and not restrictive. The scope of the invention is defined by the appended claims rather than by the description preceding them, and all changes that fall within metes and bounds of the claims, or equivalents of such metes and bounds, are intended to be embraced by the claims.

What is claimed is:

1. A semiconductor pressure detecting device including a silicon chip having first portions, a central portion between, connected to, and thinner than said first portions, said central portion of said silicon chip including a surface and at least one gauge resistance on the surface, said gauge resistance comprising a piezoresistance element including a laser recrystallized silicon film, said recrystallized silicon film including a connecting portion having edges, and two contacts electrically connected to each other by said connecting portion, said connecting portion of said recrystallized silicon film including at least one subgrain boundary transverse to and intersecting said edges, wherein the surface is a (100) or equivalent surface and said recrystallized silicon film is P-type and is arranged along a (110) direction of said silicon chip, and including respective, spaced apart metallizations disposed on corresponding subgrain boundaries of said recrystallized silicon film, whereby each of the subgrain boundaries in said connecting portion of said recrystallized silicon film between said contacts is short-circuited by a respective metallization.

2. A semiconductor pressure detecting device including a silicon chip having first portions, a central portion between, connected to, and thinner than said first portions, said central portion of said silicon chip including a surface and at least one gauge resistance on the surface, said gauge resistance comprising a piezoresistance element including a laser recrystallized silicon film, said recrystallized silicon film including a connecting portion having edges, and two contacts electrically connected to each other by said connecting portion, said connecting portion of said recrystallized silicon film including at least one subgrain boundary transverse to and intersecting said edges, wherein the surface is a (100) or equivalent surface and said recrystallized silicon film is P-type and is arranged along a (110) direction of said silicon chip, and including respective, spaced apart high dopant impurity concentration P-type regions located along corresponding subgrain boundaries of said connecting portion of said recrystallized silicon film, whereby each of the subgrain boundaries in said connecting portion of said recrystallized silicon film between said contacts is short-circuited by a respective high dopant impurity concentration P-type region.

3. A semiconductor pressure detecting device including a silicon chip having first portions, a central portion between, connected to, and thinner than said first portions, said central portion of said silicon chip including a surface and at least one gauge resistance on the surface, said gauge resistance comprising a piezoresistance element including a laser recrystallized silicon film, said recrystallized silicon film including a connecting portion and two contacts electrically connected to each other by said connecting portion, said connecting portion including a plurality of first, generally parallel, edges and a plurality of second, generally parallel, edges, the first and second edges alternating and being arranged in a staircase configuration with each first edge intersecting a second edge, and a plurality of subgrain boundaries partially disposed adjacent respective first edges of said connecting portion of said recrystallized silicon film, wherein the surface is a (100) or equivalent surface.

\* \* \* \* \*